Joseph Temple's
Impt in Tools for Cutting Moulding

71817

PATENTED
DEC 3 1867

Witnesses
A. A. Yeatman
A. W. Mason

Inventor
Joseph Temple
per
Alexander F. Mason
Atty.

United States Patent Office.

JOSEPH TEMPLE, OF TERRE HAUTE, INDIANA.

Letters Patent No. 71,817, dated December 3, 1867.

IMPROVEMENT IN CUTTER-HEADS FOR DRESSING MOULDINGS.

*The Schedule referred to in these Letters Patent and making part of the same.*

TO ALL WHOM IT MAY CONCERN:

Be it known that I, JOSEPH TEMPLE, of Terre Haute, in the county of Vigo, and in the State of Indiana, have invented certain new and useful Improvements in Tools for Cutting Moulding; and do hereby declare that the following is a full, clear, and exact description thereof, reference being had to the accompanying drawings, and to the letters of reference marked thereon.

In the annexed drawings, making part of this specification, A A represent a series of collars, which are made of suitable thickness and diameter, and flat upon their sides, so as to fit closely and snugly together when desirable. These collars are fitted upon a shaft or arbor, and secured in any known and usual way, and are provided with the teeth B B. The edges of the teeth are made sharp, so as to cut readily, and of various suitable shapes, as seen, so that when several of the collars are placed together side by side, they will form a head with teeth for cutting mouldings in any desired shape.

Figure 1:
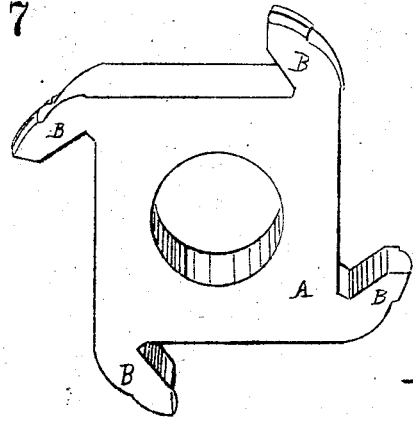
Figure 2:
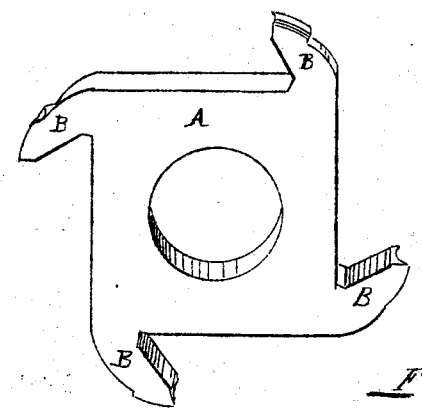
Figure 3:
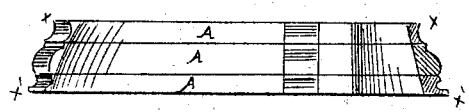

Figure 3 represents a series of these collars, placed together for cutting mouldings.

The advantage of this arrangement and construction is, that by combining the collars in various ways, different-shaped mouldings may be made, and then the cutting-edges can be sharpened until the teeth are used up, and the same shape of moulding preserved, so that they may be always made to correspond, when desirable, or made to match.

What I claim as new, is—

A moulding-cutter composed of a series of revolving disks, each one of which has on its cutting-edge the form of the section of the moulding to be cut, the several disks that form the series so arranged that, as a whole, they form a complete cutter to cut the moulding, all constructed to operate substantially as described.

In testimony that I claim the foregoing, I have hereunto set my hand, this 15th day of June, 1867.

JOSEPH TEMPLE.

Witnesses:
   J. B. AUSTIN,
   C. E. TEMPLE.